(12) United States Patent
Ugolini

(10) Patent No.: US 10,674,743 B2
(45) Date of Patent: Jun. 9, 2020

(54) APPARATUS FOR THE PRODUCTION AND DISPENSING OF FOOD PRODUCTS SUCH AS ICE CREAM AND THE LIKE

(71) Applicant: UGOLINI SPA, Opera (MI) (IT)

(72) Inventor: Marco Corrado Ugolini, Milan (IT)

(73) Assignee: UGOLINI SPA, Opera (MI) (IT)

(*) Notice: Subject to any disclaimer, the term of this patent is extended or adjusted under 35 U.S.C. 154(b) by 80 days.

(21) Appl. No.: 15/646,456

(22) Filed: Jul. 11, 2017

(65) Prior Publication Data

US 2018/0014553 A1 Jan. 18, 2018

(30) Foreign Application Priority Data

Jul. 18, 2016 (IT) .................. 102016000075074

(51) Int. Cl.
| | | |
|---|---|---|
| *A23G 9/16* | (2006.01) | |
| *A23G 9/28* | (2006.01) | |
| *A23G 1/00* | (2006.01) | |
| *A23G 9/12* | (2006.01) | |
| *A23G 9/22* | (2006.01) | |
| *A23G 9/20* | (2006.01) | |

(52) U.S. Cl.
CPC .................. *A23G 9/16* (2013.01); *A23G 1/00* (2013.01); *A23G 9/12* (2013.01); *A23G 9/20* (2013.01); *A23G 9/224* (2013.01); *A23G 9/28* (2013.01); *A23G 9/281* (2013.01); *A23G 9/288* (2013.01)

(58) Field of Classification Search
CPC ............ A23G 9/20; A23G 9/12; A23G 9/224
See application file for complete search history.

(56) References Cited

U.S. PATENT DOCUMENTS

| | | | | |
|---|---|---|---|---|
| 3,258,030 A | * | 6/1966 | Clark, Jr. .................. | A23G 9/20 137/589 |
| 3,866,801 A | * | 2/1975 | Stapleton ............... | A23G 9/166 222/146.6 |
| 3,898,858 A | | 8/1975 | Erickson | |
| 3,930,535 A | * | 1/1976 | Menzel ..................... | A23G 9/20 165/254 |
| 4,412,428 A | * | 11/1983 | Giannella .............. | A23G 9/281 366/155.1 |
| 4,653,281 A | * | 3/1987 | Van Der Veer ........ | A23G 9/045 366/144 |

(Continued)

OTHER PUBLICATIONS

Italian Search Report and Written Opinion for related application IT 2016000075074, 6 pgs.

*Primary Examiner* — Christopher R Zerphey
(74) *Attorney, Agent, or Firm* — Fredrikson & Byron, P.A.

(57) ABSTRACT

An apparatus (10) for the production and dispensing of chilled food products, such as ice cream or the like, comprises a refrigerated top tank (12) intended to contain a liquid preparation, and an underlying refrigerated cylinder (14) which contains a motor-driven scraper (15) and which receives the liquid preparation from the top tank (12) in order to produce from it the final product and dispense it controllably through a tap (16) at one end of the cylinder (14). The liquid preparation passes between the top tank (12) and the refrigerated cylinder (14) via a mixer pipe (21) which mixes air with the passing preparation. The top tank (12) contains a motor-driven screw (26) rotating about a horizontal axis so as to push the product inside the tank (12) towards the mixer pipe (21).

9 Claims, 2 Drawing Sheets

(56) References Cited

U.S. PATENT DOCUMENTS

| | | | | |
|---|---|---|---|---|
| 4,817,396 A | * | 4/1989 | Menzel | A23G 9/163 |
| | | | | 62/306 |
| 4,850,205 A | | 7/1989 | Mills | |
| 5,072,599 A | * | 12/1991 | Simone | A23G 9/163 |
| | | | | 137/625.3 |
| 5,201,861 A | | 4/1993 | Menzel | |
| 5,706,720 A | * | 1/1998 | Goch | A23G 9/20 |
| | | | | 366/149 |
| 5,788,370 A | * | 8/1998 | Pedrazzi | A23G 9/045 |
| | | | | 165/87 |

* cited by examiner

APPARATUS FOR THE PRODUCTION AND DISPENSING OF FOOD PRODUCTS SUCH AS ICE CREAM AND THE LIKE

RELATED APPLICATIONS

This application claims priority to Italian Application No. 102016000075074, filed Jul. 18, 2016, the teachings of which are incorporated herein by reference.

DESCRIPTION

The present invention relates to an apparatus for the production and dispensing of cold paste-like food products, such as ice cream and the like.

In the production of cold paste-like products such as ice cream, known apparatus comprise a top tank intended to keep chilled the basic preparation or liquid for preparation of the final product, and a bottom refrigerated cylinder inside which the preparation supplied from the top tank is gradually introduced so as to be converted into the final product which is then controllably dispensed via a special tap with which the bottom cylinder is provided.

Whenever a portion of final product is dispensed, an identical amount of preparation passes by means of gravity from the top tank to the bottom cylinder so as to ensure continuity of the product which is ready for dispensing.

Usually the top tank contains a mixer with horizontal parallel blades which keeps the preparation mixed, while the bottom cylinder contains a scraper with blades arranged spirally around a horizontal axis so as to knead and form the final product with the right pasty consistency, prevent it from sticking to the inner walls of the refrigerated cylinder and convey it towards the tap which is usually arranged at a front end of the cylinder.

Since, in order to obtain a soft and light final product, it is necessary to incorporate inside it also a certain amount of air, the connection between the top tank and the bottom cylinder is realized by means of a mixing pipe which, in addition to allowing the basic preparation to pass through from the top tank to the bottom cylinder, mixes with it a certain amount of air which may also be regulated by means of a suitable action on the said mixing pipe. The user may therefore determine the pasty consistency and lightness of the final product by adjusting the appropriate control device on the mixing pipe.

However, in the known machines there is often the drawback that, during the product preparation cycle, the amount of air incorporated inside the product does not remain constant at the initially set value and the dispensed product therefore does not have a uniform quality.

For example, the last metered amounts of product (i.e. when the top tank is nearly empty) may contain too much air with respect to the initial setting made soon after complete filling of the top tank. In other words, the air/product mixture is often too greatly affected by the amount of product present in the top tank. This means that the user must periodically modify the setting during operation of the machine, but this may be time-consuming and in any case does not allow a satisfactory result to be obtained owing to the non-uniform and unpredictable result of the setting operation.

Also attempts in the prior art to modify the structure of the mixing pipe in order to improve the stability of mixing over time have not produced satisfactory results.

Machines with top tanks for the liquid product are for example described in U.S. Pat. Nos. 4,850,205, 5,201,861 A and 3,898,858.

The general object of the present invention is to overcome the aforementioned problems of the prior art by providing an apparatus for the production and dispensing of cold paste-like food products which is able to ensure a better uniformity during production.

In view of this object the idea has occurred to provide an apparatus according to claim 1.

In particular, according to the invention, an apparatus for the production and dispensing of chilled food products, may comprise a refrigerated top tank intended to contain a liquid preparation, and an underlying refrigerated cylinder which contains a motor-driven scraper and which receives the liquid preparation from the top tank in order to produce from it the final product and dispense it controllably through a tap at one end of the cylinder, the liquid preparation passing between the top tank and the refrigerated cylinder through a mixer pipe which mixes air with the passing preparation. The top tank contains a motor-driven screw rotating about a horizontal axis so as to push the product inside the tank towards the mixer pipe.

In order to illustrate more clearly the innovative principles of the present invention and its advantages compared to the prior art, an example of embodiment applying these principles will be described below with the aid of the accompanying drawings. In the drawings.

Figure 1:
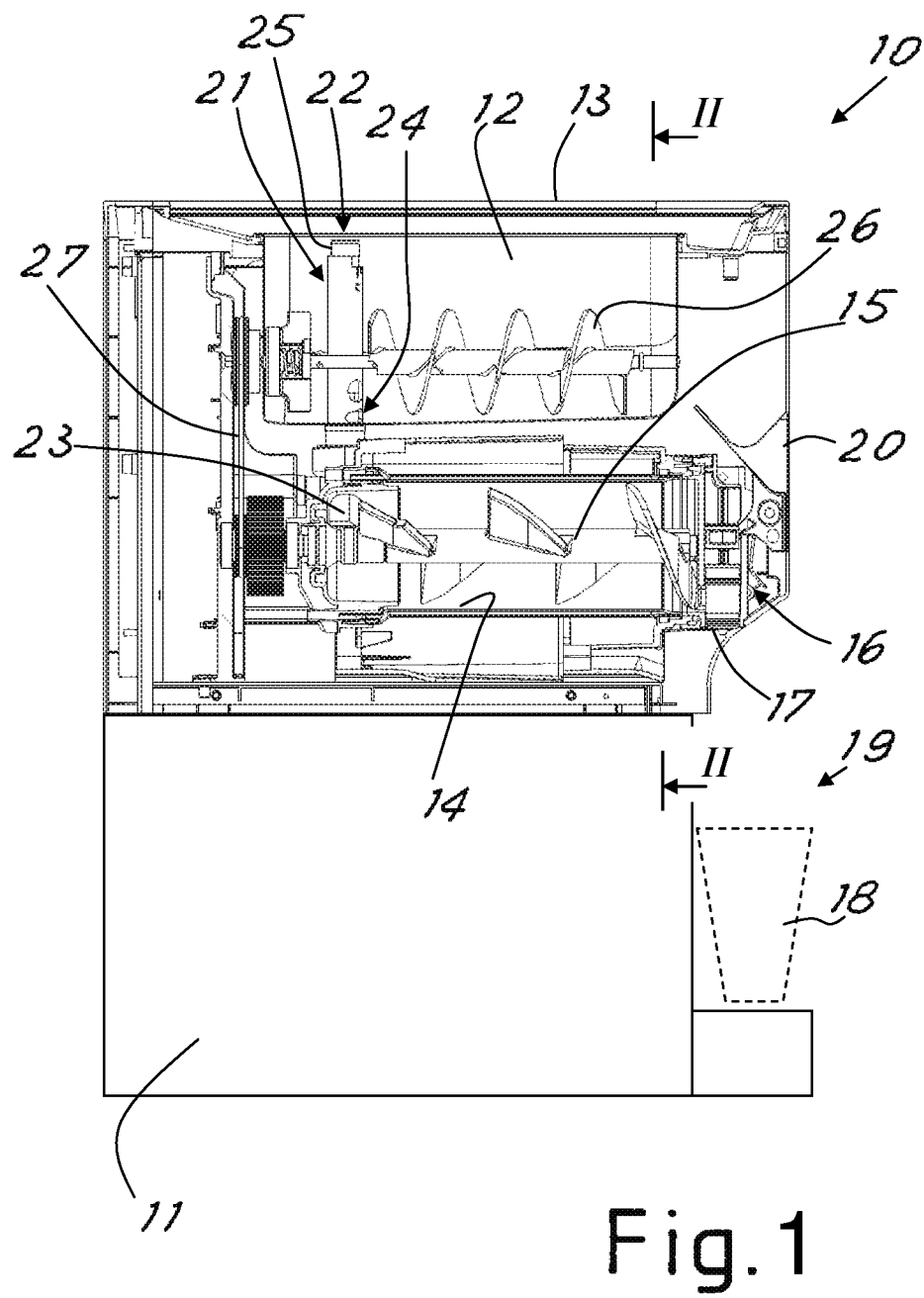
FIG. 1 shows a schematic, partially sectioned, elevation view of an apparatus applying the principles of the present invention.

With reference to the figures, FIG. 1 shows in schematic form an apparatus, denoted generically by 10, applying the principles of the invention.

The apparatus 10 comprises a base 11 which contains known refrigerating and electrical circuits (not shown) for conventional operation of the machine.

The apparatus 10 also contains a top tank 12 which is intended to receive the basic liquid preparation for preparation of the product to be dispensed. The tank is advantageously provided with a lid 13 for periodically topping up the product inside it.

The apparatus 10 also comprises a cylinder 14 for preparing the final product, which is arranged underneath the tank 12. Both the tank 12 and the cylinder 14 are suitably chilled by means of the refrigerating unit contained in the base 11, so as to keep the basic preparation and the final product at the respective correct temperatures. For example, the top tank may be chilled so as to keep the preparation at a temperature of around 2-6° C., while the cylinder may be chilled so as to obtain the final product at a temperature of about −5° C. The temperatures will also depend on the specific product to be prepared and dispensed, as is known to the person skilled in the art.

The bottom cylinder, or kneader 14, contains a known motor-driven scraper 15 which rotates about a horizontal axis coaxial with the cylinder and produces the correct stirring of the product inside the cylinder and pushes it towards a discharge tap 16 for allowing dispensing of metered amounts of product through an opening 17, for example so as to fill a suitable single-dose container 18 (for example, a cone or a glass) placed in the dispensing zone 19 underneath the opening 17. The tap 16 (advantageously of the vertical plunger type) may be for example manually operated by means of an operating lever 20.

The top tank 12 and the bottom cylinder 14 are connected together by means of a mixing pipe 21. The pipe is preferably arranged vertically so as to project from the bottom of the tank and have a top free end 22 close to the top edge of the tank. The opposite bottom end 23 of the mixing pipe may project instead inside the cylinder 14.

The mixing pipe 21 (also called "carburettor") has one or more lateral passages or openings 24 which are preferably arranged close to the bottom of the tank and through which the liquid inside the tank may enter into the pipe and pass out into the cylinder 14 via the bottom end 23.

With the passing of the liquid through the pipe towards the bottom cylinder, the air is simultaneously sucked in through the top end 22 of the mixing pipe (which always remains above the free surface of the liquid inside the tank) and is mixed with the liquid directed towards the refrigerated cylinder 14.

The air/liquid ratio may be adjusted by means of rotation of a hollow tubular insert 25 which is inserted inside the mixing pipe so as to project with its operating end from the top end of the mixing pipe. The insert has an opposite bottom end which with the rotation closes to a greater or lesser degree the lateral openings 24. For example, by manually rotating the operating end 25 it is possible to pass from a completely open condition of the lateral openings 24 to a completely closed condition of the lateral openings.

As can be clearly seen in FIG. 1, at least one lateral opening 24 is advantageously arranged so as to have its bottom edge substantially flush with the bottom of the tank.

The mixing pipe is advantageously arranged towards one end of the tank (preferably the rear end relative to the dispensing tap 16). A motor-driven mixing screw 26 is arranged inside the tank so as to rotate with a substantially horizontal axis and is configured so as to push axially the product towards the mixing pipe. Moreover, the passages 24 (or single passage 24) is/are advantageously directed towards the mixing screw 26 so as to receive directly the product flow pushed by the screw towards the mixing pipe, preferably with a component substantially parallel to the bottom of the tank.

Of the two passages 24 shown in FIG. 1, the one closest to the bottom may be the normal inlet passage for the liquid directed towards the bottom cylinder during the normal operation of the machine, while the higher passage, with larger dimensions, may be arranged so as to open up upon extraction of the insert 25 from the mixing pipe, thus allowing rapid filling of the bottom cylinder when the apparatus starts from empty.

Figure 2:
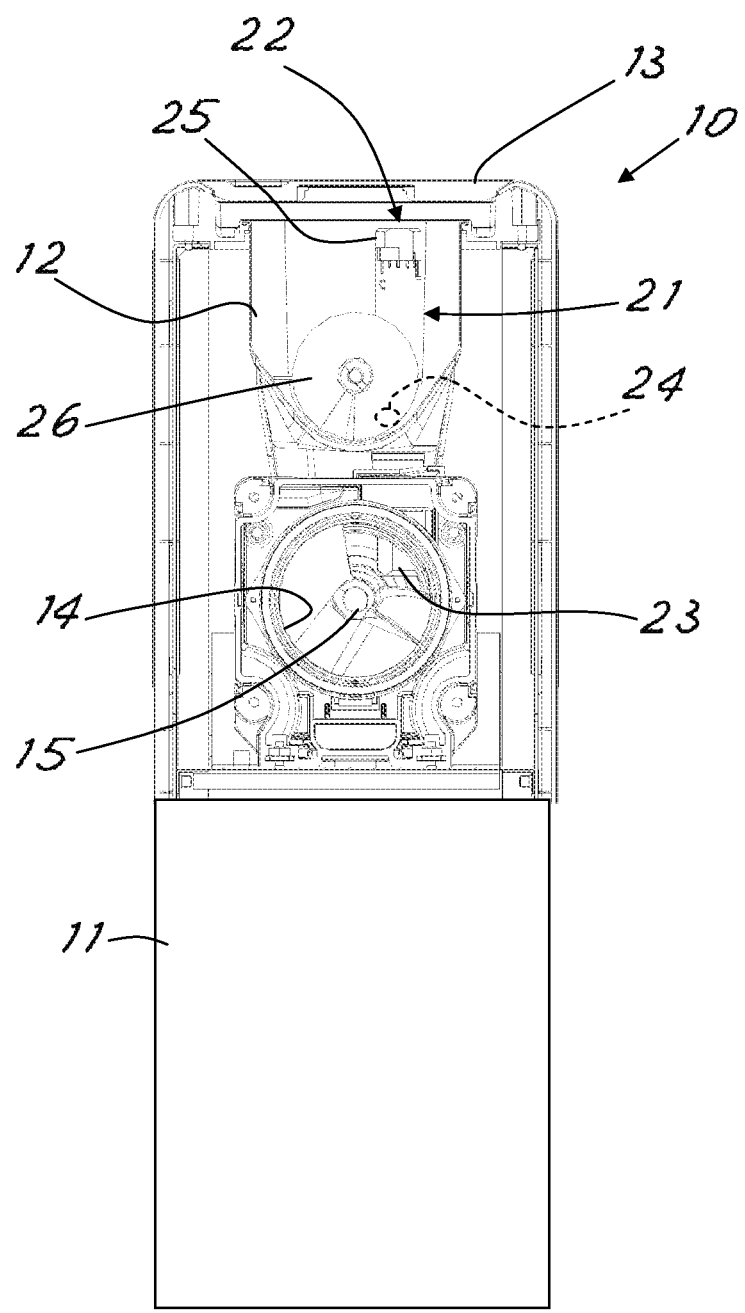
FIG. 2 shows a cross-sectional view along the line II-II of FIG. 1.

As can be seen in FIG. 1, the mixing screw 26 may be advantageously realized in the form of a cylindrical-spiral screw. As can be seen in FIG. 2, the bottom of the tank may be shaped with a cylindrical extension matching the screw so that the screw lightly touches said bottom during a part of its angular rotation. The thrust effect towards the passage 24 is thus increased.

The movement of the screw 26 may also be obtained by connecting the axis of rotation of the screw to the motor-driven axis of rotation of the scraper 15 by means of a suitable transmission (for example a belt) so as to use a single rotational motor.

It has been found that by using instead of a simple stirrer a screw which pushes towards the mixing pipe the liquid inside the tank as mentioned above, the air/liquid mixture of the product directed towards the bottom cylinder 14 is much less affected by the variations in level of the said product inside the tank and is much more constant in all conditions.

The end result is a product dispensed with very uniform characteristics during the entire production period, from the first to the last amounts of dispensed product. All of this without the need for costly adjustment systems.

At this point it is clear how the objects of the invention have been achieved.

Obviously the description above of an embodiment applying the innovative principles of the present invention is provided by way of example of these innovative principles and must therefore not be regarded as limiting the scope of the rights claimed herein. For example, the exact form, proportion and arrangement of the various parts of the apparatus may vary depending on the specific practical requirements.

Moreover, the apparatus may comprise any other element known to the person skilled in the art for this type of machine, such as a display showing the operating cycles, sanitization and washing systems, etc. The apparatus may obviously be disassembled into its various parts for cleaning. For example, the screw may be easily removed from the tank by means of a known engaging (for example magnetic) system, as may now be easily imagined by the person skilled in the art.

The invention claimed is:

1. An apparatus for production and dispensing of chilled food products, comprising a refrigerated top tank to contain a liquid preparation, and an underlying refrigerated cylinder which contains a motor-driven scraper and which receives the liquid preparation from the top tank so as to produce from the liquid preparation a final product and dispense the final product controllably via a tap at one end of the refrigerated cylinder, the liquid preparation passing between the top tank and the refrigerated cylinder via a mixer pipe, which mixes air with the passing liquid preparation, characterized in that the mixer pipe has at least one inlet passage for the liquid preparation and that the top tank has a motor-driven screw which rotates about a horizontal axis across the top tank and when rotated, pushes the liquid preparation inside the top tank in a direction toward the at least one inlet passage in the mixer pipe in which air is added to the liquid preparation prior to flowing into the refrigerated cylinder, with an air-liquid ratio for the liquid preparation being based on a rate at which the liquid preparation is pushed by the screw toward the mixer pipe.

2. The apparatus according to claim 1, characterized in that the mixer pipe projects vertically from the bottom of the top tank, so as to have a top end which is open in close proximity to a top edge of the tank such that the top end is above the free surface of the liquid preparation inside of the tank and which forms an air inlet and has at least the inlet passage for the liquid preparation, which is directed towards the motor-driven screw and is in close proximity to the bottom of the tank such that the at least one inlet passage is arranged with a bottom edge that is flush with the bottom of the tank.

3. The apparatus according to claim 2, characterized in that the mixer pipe has an insert which is rotatable by means of an operating end which projects from the open top end of the mixing pipe so as to be movable between a position for closing and a position for opening the inlet passage for the liquid preparation.

4. The apparatus according to claim 1, characterized in that the motor-driven screw is a cylindrical-spiral horizontal-axis screw.

5. The apparatus according to claim 4, characterized in that the bottom of the tank has a cylindrical progression matching that of the cylindrical-spiral horizontal-axis screw so that the screw touches the bottom of the tank during part of angular rotation of the screw.

6. The apparatus according to claim 1, characterized in that the top tank is provided with a lid for periodically topping the product inside the tank.

7. The apparatus according to claim 2, characterized in that the bottom end of the mixing pipe is arranged opposite the top end and projects inside of the refrigerated cylinder.

8. The apparatus according to claim 1, characterized in that the motor-driven screw rotates about the horizontal axis across only a portion of the top tank.

9. The apparatus according to claim 8, characterized in that the motor-driven screw extends up to a lateral side of the mixer pipe.

* * * * *